(12) United States Patent
Hatfield et al.

(10) Patent No.: US 11,144,759 B1
(45) Date of Patent: Oct. 12, 2021

(54) PRESENTATION OF GRAPHICAL OBJECTS ON DISPLAY BASED ON INPUT FROM REAR-FACING CAMERA

(71) Applicant: Lenovo (Singapore) Pte. Ltd., Singapore (SG)

(72) Inventors: Nathan Andrew Hatfield, Raleigh, NC (US); Jonathan Co Lee, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/930,354

(22) Filed: May 12, 2020

(51) Int. Cl.
- *G06K 9/00* (2006.01)
- *H04W 12/33* (2021.01)
- *G02B 27/01* (2006.01)

(52) U.S. Cl.
CPC ........ *G06K 9/00671* (2013.01); *H04W 12/33* (2021.01); *G02B 27/0172* (2013.01); *G02B 2027/014* (2013.01); *G02B 2027/0138* (2013.01); *G02B 2027/0141* (2013.01)

(58) Field of Classification Search
CPC ........... G06F 3/048; G06F 2203/04804; G06F 3/04815; G06F 3/011; G06F 2203/04803; G06F 3/04812; H04L 67/22; H04L 67/18; G06T 2200/24; G06T 19/006; H04N 21/4223; H04N 21/4312; G02B 27/0172; G02B 2027/0138; G02B 2027/0141; G02B 2027/014; G06K 9/00671; H04W 12/33; H04W 12/30
See application file for complete search history.

(56) References Cited

U.S. PATENT DOCUMENTS

| 4,045,885 | A  | * | 9/1977  | Stern ...................... | G09B 27/02 434/286 |
| 6,320,496 | B1 | * | 11/2001 | Sokoler ................... | G06F 3/016 340/407.1 |
| 6,798,443 | B1 | * | 9/2004  | Maguire, Jr. ........... | G06F 3/011 345/8 |
| 7,899,469 | B2 | * | 3/2011  | Casey ..................... | G01C 21/20 455/456.3 |
| 8,023,963 | B2 | * | 9/2011  | Yonker ................... | G01S 5/0045 455/456.1 |

(Continued)

FOREIGN PATENT DOCUMENTS

| CN | 101568802 B | 4/2012 |
| CN | 107092638 A | 8/2017 |

(Continued)

OTHER PUBLICATIONS

Lee et al., "Techniques for Providing Vibrations at Headset", file history of related U.S. Appl. No. 16/588,478, filed Sep. 30, 2019.

(Continued)

*Primary Examiner* — Michael J Jansen, II
(74) *Attorney, Agent, or Firm* — John M. Rogitz; John L. Rogitz

(57) ABSTRACT

A rear-facing camera may be disposed on a headset or other device. Input from the rear-facing camera may be used to present graphical objects on a display of the headset, such as breadcrumbs indicating previous movement of the headset and/or a virtual tether to a device different from the headset.

20 Claims, 9 Drawing Sheets

(56) References Cited

U.S. PATENT DOCUMENTS

| | | | | |
|---|---|---|---|---|
| 8,094,091 B2* | 1/2012 | Noma | G02B 27/017 | 345/8 |
| 8,131,271 B2* | 3/2012 | Ramer | G06F 16/9577 | 455/414.1 |
| 8,150,617 B2* | 4/2012 | Manber | H04W 4/02 | 701/426 |
| 8,229,458 B2* | 7/2012 | Busch | H04L 67/22 | 455/456.1 |
| 8,706,416 B2* | 4/2014 | Wang | G01C 21/3469 | 701/533 |
| 8,718,614 B2* | 5/2014 | Kolodziej | H04W 4/023 | 455/414.1 |
| 8,788,197 B2* | 7/2014 | Fink | G03F 7/70891 | 701/436 |
| 8,825,387 B2* | 9/2014 | Mays | G01C 21/206 | 701/433 |
| 8,922,480 B1* | 12/2014 | Freed | G06F 21/60 | 345/156 |
| 8,973,149 B2* | 3/2015 | Buck | G09G 3/20 | 726/26 |
| 8,996,304 B2* | 3/2015 | Needham | G01C 21/3476 | 701/426 |
| 9,063,633 B2* | 6/2015 | Rajasingham | H04N 13/344 | |
| 9,080,890 B2* | 7/2015 | Svendsen | G01C 21/3611 | |
| 9,117,066 B2* | 8/2015 | Nathan | G06F 21/32 | |
| 9,247,779 B1* | 2/2016 | Aloumanis | G08G 1/137 | |
| 9,405,918 B2* | 8/2016 | Freed | G06F 21/82 | |
| 9,541,411 B2* | 1/2017 | Tang | G01C 21/3415 | |
| 9,799,301 B2* | 10/2017 | Sahin | G06F 1/163 | |
| 9,851,561 B2* | 12/2017 | Lu | G06F 3/012 | |
| 9,898,868 B2* | 2/2018 | Aonuma | G02B 27/0172 | |
| 10,012,508 B2* | 7/2018 | Beaumont | G01C 21/206 | |
| 10,257,434 B2* | 4/2019 | Arnold | A42B 3/22 | |
| 10,283,081 B2* | 5/2019 | Sahin | G06F 3/0346 | |
| 10,324,290 B2* | 6/2019 | Weller | H04N 5/2252 | |
| 10,437,460 B2* | 10/2019 | Moore | G01C 21/3664 | |
| 10,464,482 B2* | 11/2019 | Shuster | G06F 3/013 | |
| 10,521,944 B2* | 12/2019 | Sareen | G06F 3/017 | |
| 10,809,081 B1* | 10/2020 | Kentley-Klay | G06T 19/006 | |
| 10,916,216 B2* | 2/2021 | Sahin | G06F 1/28 | |
| 10,991,292 B2* | 4/2021 | Shin | G06F 21/84 | |
| 2007/0194902 A1* | 8/2007 | Blanco | G01C 21/365 | 340/461 |
| 2007/0229396 A1* | 10/2007 | Rajasingham | G06F 3/013 | 345/8 |
| 2007/0266239 A1* | 11/2007 | Vismans | G06Q 20/102 | 713/159 |
| 2008/0001847 A1* | 1/2008 | Kratchounova | G01C 23/00 | 345/1.1 |
| 2009/0216438 A1* | 8/2009 | Shafer | G01C 21/20 | 701/414 |
| 2011/0144902 A1* | 6/2011 | Forte | G01C 21/20 | 701/533 |
| 2011/0270522 A1* | 11/2011 | Fink | G01J 1/04 | 701/532 |
| 2011/0301835 A1* | 12/2011 | Bongiorno | G06Q 10/02 | 705/6 |
| 2012/0150431 A1* | 6/2012 | Ooka | G01C 21/3652 | 701/425 |
| 2012/0242591 A1* | 9/2012 | Kawalkar | G06F 3/04886 | 345/173 |
| 2012/0284281 A1* | 11/2012 | Meyer | H04W 4/029 | 707/743 |
| 2013/0029685 A1* | 1/2013 | Moshfeghi | G06Q 20/409 | 455/456.1 |
| 2013/0127980 A1* | 5/2013 | Haddick | G02B 27/0093 | 348/14.08 |
| 2014/0125789 A1* | 5/2014 | Bond | G03B 17/54 | 348/77 |
| 2014/0201844 A1* | 7/2014 | Buck | G06F 21/554 | 726/26 |
| 2014/0214267 A1* | 7/2014 | Sellschopp | G01C 21/3469 | 701/34.2 |
| 2015/0116212 A1* | 4/2015 | Freed | G06F 1/1686 | 345/156 |
| 2015/0193819 A1* | 7/2015 | Chang | G06Q 10/1095 | 705/7.19 |
| 2015/0317956 A1* | 11/2015 | Lection | G02B 27/00 | 345/633 |
| 2016/0104451 A1* | 4/2016 | Sahin | G06F 3/0346 | 345/519 |
| 2016/0154240 A1* | 6/2016 | Lee | G02B 27/0093 | 345/8 |
| 2016/0189442 A1* | 6/2016 | Wright | H04M 1/6041 | 701/33.2 |
| 2016/0224106 A1* | 8/2016 | Liu | G06F 3/013 | |
| 2017/0078529 A1* | 3/2017 | Datikashvili | G06F 21/31 | |
| 2017/0176746 A1* | 6/2017 | Weller | G02B 27/0172 | |
| 2017/0184846 A1* | 6/2017 | Lu | G06F 1/163 | |
| 2017/0329139 A1* | 11/2017 | Shearman | G02B 5/20 | |
| 2018/0108322 A1* | 4/2018 | Sahin | G06F 1/163 | |
| 2018/0249087 A1* | 8/2018 | Arnold | A41D 1/04 | |
| 2019/0057531 A1* | 2/2019 | Sareen | G06F 3/011 | |
| 2019/0126824 A1* | 5/2019 | Oba | E05F 15/70 | |
| 2019/0293943 A1* | 9/2019 | Weller | H04N 5/23293 | |
| 2019/0303626 A1* | 10/2019 | Kaladgi | G06F 3/0484 | |
| 2019/0392779 A1* | 12/2019 | Sahin | G09G 3/001 | |
| 2020/0193068 A1* | 6/2020 | Jones | G06T 7/20 | |
| 2020/0226966 A1* | 7/2020 | Shin | G09G 3/2003 | |
| 2021/0120213 A1* | 4/2021 | Beni | G02B 27/0101 | |

FOREIGN PATENT DOCUMENTS

| | | |
|---|---|---|
| EP | 0578788 A1 | 1/1994 |
| GB | 201018815 | 12/2010 |
| JP | 3669702 B2 | 7/2005 |
| JP | 4547721 B2 | 9/2010 |
| JP | 5487677 B2 | 5/2014 |
| KR | 100763238 B1 | 10/2007 |
| WO | 2015133889 A1 | 9/2015 |

OTHER PUBLICATIONS

Liviu, Marica, "Back Seat Transparent Touchscreen Window", Jul. 24, 2011, https://www.youtube.com/watch?v=ct6dpX7dZzl.

Peterson et al., "Presentation to User of Indication of Object at Which Another Person Is Looking", file history of related U.S. Appl. No. 16/126,567, filed Sep. 10, 2018.

Tonnis and Klinker, "Effective Control of a Car Driver's Attention for Visual and Acoustic Guidance towards the Direction of Imminent Dangers", 2006, Proceedings of the ISMAR. 13-22, Oct. 1, 2006, 10.1109/ISMAR.2006.207789.

Wii U SiNG Party Official Trailer, 2013, https://www.youtube.com/watch?v=TGdnj7APnJo.

Corning Incorporated, "Day Made of Glass 2: Same Day. Expanded Corning Vision (2012)", Feb. 3, 2012. https://youtube.com/watch?v=jZkHpNnXLB0.

* cited by examiner

PRESENTATION OF GRAPHICAL OBJECTS ON DISPLAY BASED ON INPUT FROM REAR-FACING CAMERA

FIELD

The present application relates to technically inventive, non-routine solutions that are necessarily rooted in computer technology and that produce concrete technical improvements.

BACKGROUND

As recognized herein, current devices are limited in their functionality in that they only provide certain limited ways for user interaction. This might be problematic for, e.g., novice and cognitively-impaired device users that might have more difficulty than others in following navigational directions presented on an electronic display as well as keeping apprised of the location of friends and family with whom they may be traveling. There are currently no adequate solutions to the foregoing computer-related, technological problem.

SUMMARY

Accordingly, in one aspect a headset includes at least one processor, a rear-facing camera accessible to the at least one processor, a transparent display accessible to the at least one processor, and storage accessible to the at least one processor. The storage includes instructions executable by the at least one processor to receive input from the rear-facing camera and to, based on the input, present a feed from the rear-facing camera on the transparent display along with at least one graphical object overlaid on the feed.

In various implementations, the at least one graphical object may include plural breadcrumbs indicating previous movement of the headset, an arrow indicating previous movement of the headset, a graphical object indicating a current location of a device different from the headset, and/or a virtual tether to a device different from the headset that is indicated in the feed.

In some examples, the instructions may be executable to make the feed available to a remotely-located device different from the headset.

Further, in some implementations the at least one graphical object may include a first graphical object and the instructions may be executable to, concurrent with presentation of the first graphical object, present a second graphical object on the transparent display at a location other than where the feed is being presented. The second graphical object may indicate at least a portion of a route for an end-user to follow and/or a current location of a device different from the headset. Additionally or alternatively, the second graphical object may include breadcrumbs indicating a path of another device different from the headset and/or a virtual tether to a device different from the headset.

In another aspect, a method includes receiving input from a rear-facing camera of a first device and, based on the input, presenting images from the rear-facing camera on a display of the first device along with at least one graphical object overlaid on the images.

The at least one graphical object may include one or more breadcrumbs indicating previous movement of the first device and/or a graphical object indicating a current location of a second device different from the first device. Additionally or alternatively, the at least one graphical object may include a virtual tether to a second device different from the first device that is indicated in the feed.

Also, in some implementations the method may include monitoring, using input from the rear-facing camera, at least one person identified from the input from the rear-facing camera and providing a notification on the display regarding the person. So, for example, the method may include monitoring the person to determine that the person is looking at a second device associated with an end-user of the first device and then providing a notification on the display that the person is looking at the second device. As another example, the method may include monitoring the person's speed as the person approaches the first device to determine that the person is approaching the first device at a first rate above a threshold rate and then providing a notification on the display that the person is approaching the first device.

In still another aspect, at least one computer readable storage medium (CRSM) that is not a transitory signal includes instructions executable by at least one processor to receive input from a rear-facing camera of a device and, based on the input, present images from the rear-facing camera on a display of the device and present at least one graphical object overlaid on one or more of the images.

In some implementations, the device may be a first device and the graphical object may be presented based on communication with a second device different from the first device. The first and second devices may communicate at least in part using a mesh network.

The details of present principles, both as to their structure and operation, can best be understood in reference to the accompanying drawings, in which like reference numerals refer to like parts, and in which:

DETAILED DESCRIPTION

Figure 1:
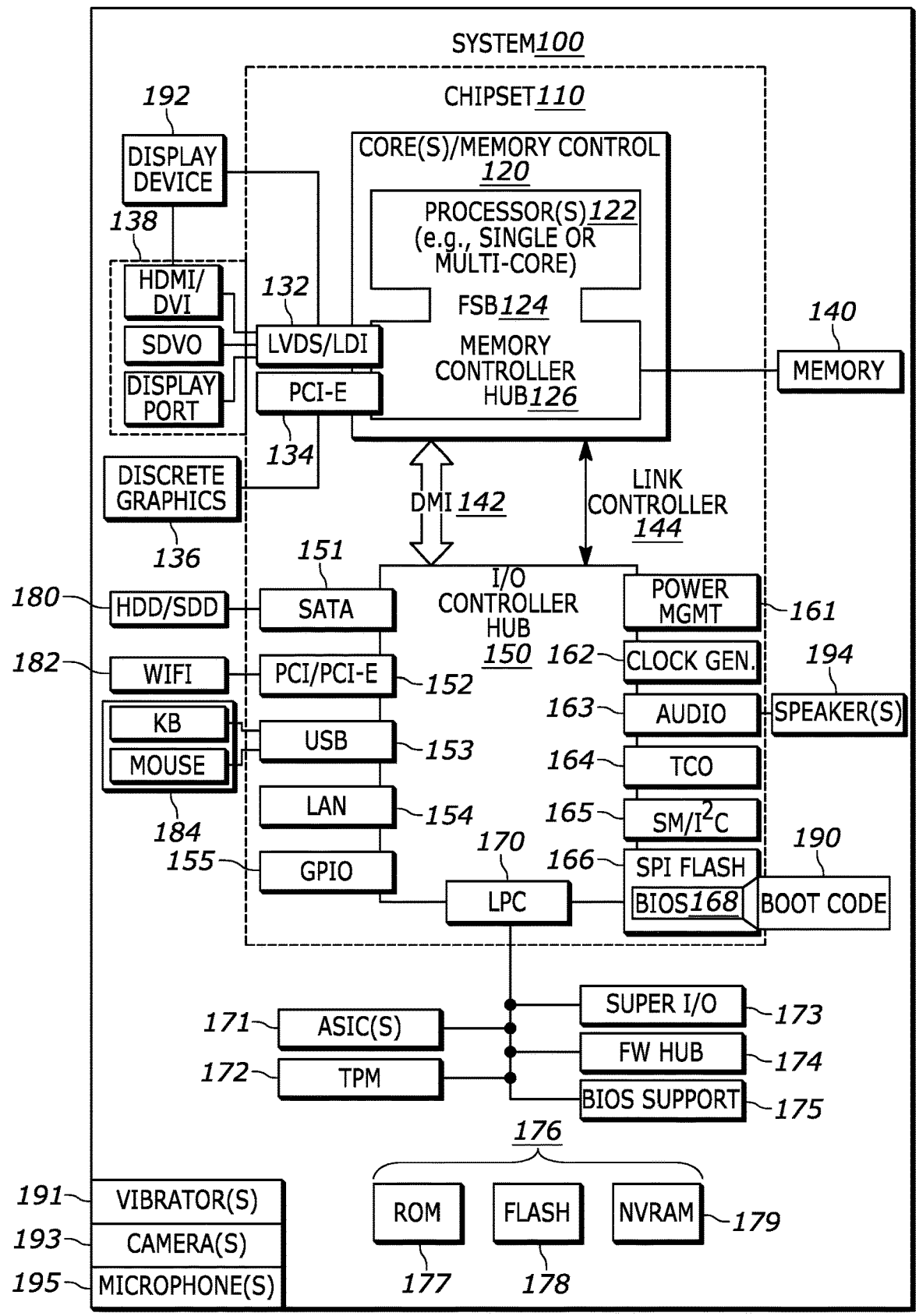
FIG. 1 is a block diagram of an example system consistent with present principles.

Among other things, the present application discloses using augmented reality systems to present virtual objects and other information to a user to assist with navigation while walking or driving a vehicle, for example. This may help users become more aware of their surroundings, develop trust with the navigation application and device itself, and provide for easier device use in following directions. Rear-facing cameras in particular may be used for such purposes. The rear-facing camera(s) may be, for example, on the rear of one leg of a smart glasses headset or on the front of a smart phone (same side bearing a display). The camera may produce a live feed for the user to view when traversing towards a target destination.

Additionally, the headset (or other device) may provide a virtual bread-crumbing pathway via the rear camera to allow the user to see that the AR headset is tracking their steps, thereby relieving angst and increasing trust. In addition, the virtual breadcrumbs can persist for round trips, making routes more familiar and easier to follow and reverse course.

Additionally, present principles allow users that travel in packs to see who is behind them at all times to reduce the chances of separation. The rear-facing camera can create virtual tethers to other users that are traveling the same route and that are wearing another headset or using a mobile phone. This virtual tethering may be used in a digital IoT (Internet of Things) mesh of the surrounding area where users are consistently and constantly receiving data feedback of each other across the space.

Present principles may also allow remote caregivers and others to tune into the live feed to monitor the user's progress.

Present principles may also allow users to remain cognizant of their environment and aware of potential safety threats. For example, users traveling with an expensive head mounted display may attract unwanted attention from those who wish to do harm. The rear-facing camera can be set to monitor the distance and speed of potential threats approaching the user from behind. When in a non-crowded area, this feature can easily identify unlikely behaviors as well using action recognition, though this can also be tuned for larger cities and other more densely-populated areas where people would typically be more-proximal to the user.

The present application also discloses features to provide awareness to users that someone is staring at their PC when the head-mounted display (HMD) is on. For example, the rear camera could detect pupils of another person, which could mean that someone is staring at the user's PC and the HMD can alert the user of the security risk.

IoT mesh sessions may even be used to enable enhanced people-tracking, e.g., for groups of people that know each other. For example, it is common for users to bicycle together. If the lead cyclist turns down a certain path, the device may alert the surrounding devices in the network of the lead user's path to allow the other people to follow it in real-time. In the HMDs of the cyclists following the leader, directional wayfinding visual cues may then be displayed (such as an arrow veering off to the right).

Additionally, an IoT mesh of cameras in a cluster may be used to stitch together environments. Since users may have a front-facing and rear-facing cameras on their HMDs or other device being used (e.g., smart phone with cameras on opposing sides), images from these cameras could be stitched together to provide a more contextual view of the surrounding area.

Prior to delving further into the details of the instant techniques, note with respect to any computer systems discussed herein that a system may include server and client components, connected over a network such that data may be exchanged between the client and server components.

The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include one or more vibrators 191. Each of the vibrators 191 may be established by an electric motor connected to an off-center and/or off-balanced weight via the motor's rotatable shaft. The shaft may then rotate under control of the motor to create vibration.

The system 100 may further include an audio receiver/microphone 195 that provides input from the microphone 195 to the processor 122 based on audible input that is detected, such as audible input from an end-user. Still further, the system 100 may include a camera 193 that gathers one or more images and provides them to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
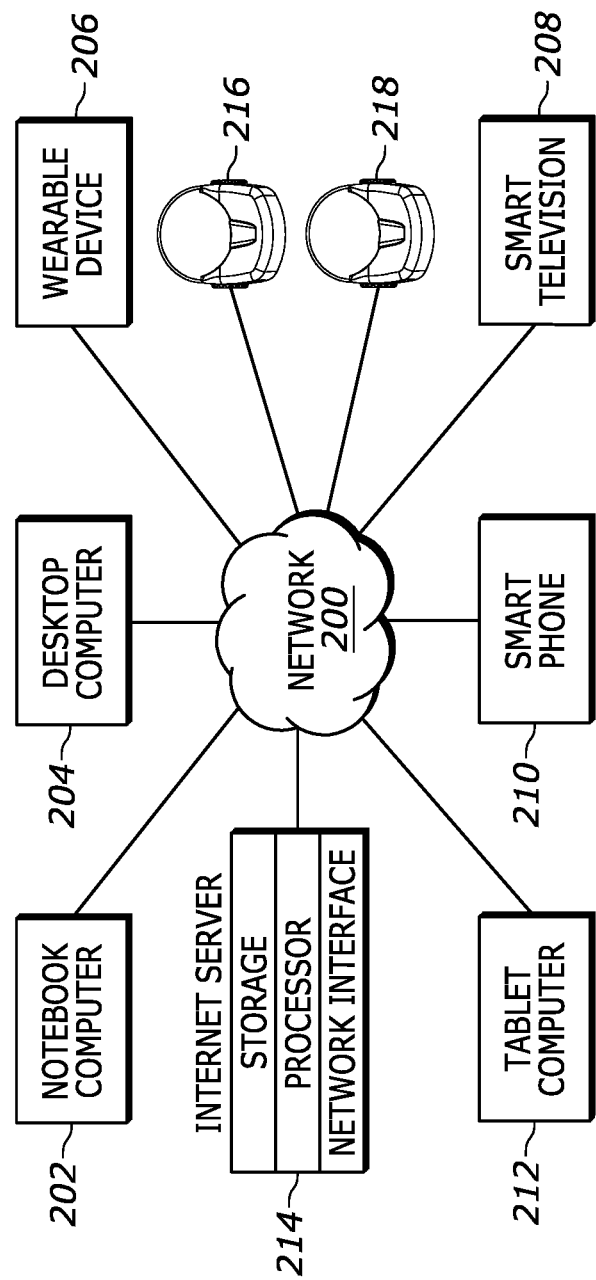
FIG. 2 is a block diagram of an example network of devices consistent with present principles.

Turning now to FIG. 2, example devices are shown communicating over a network 200 such as the Internet or a local mesh network consistent with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, headsets 216 and 218, and a server 214 such as an Internet server that may provide cloud storage accessible to the devices 202-212, 216, 218. It is to be understood that the devices 202-218 are configured to communicate with each other over the network 200 to undertake present principles.

Figure 3:
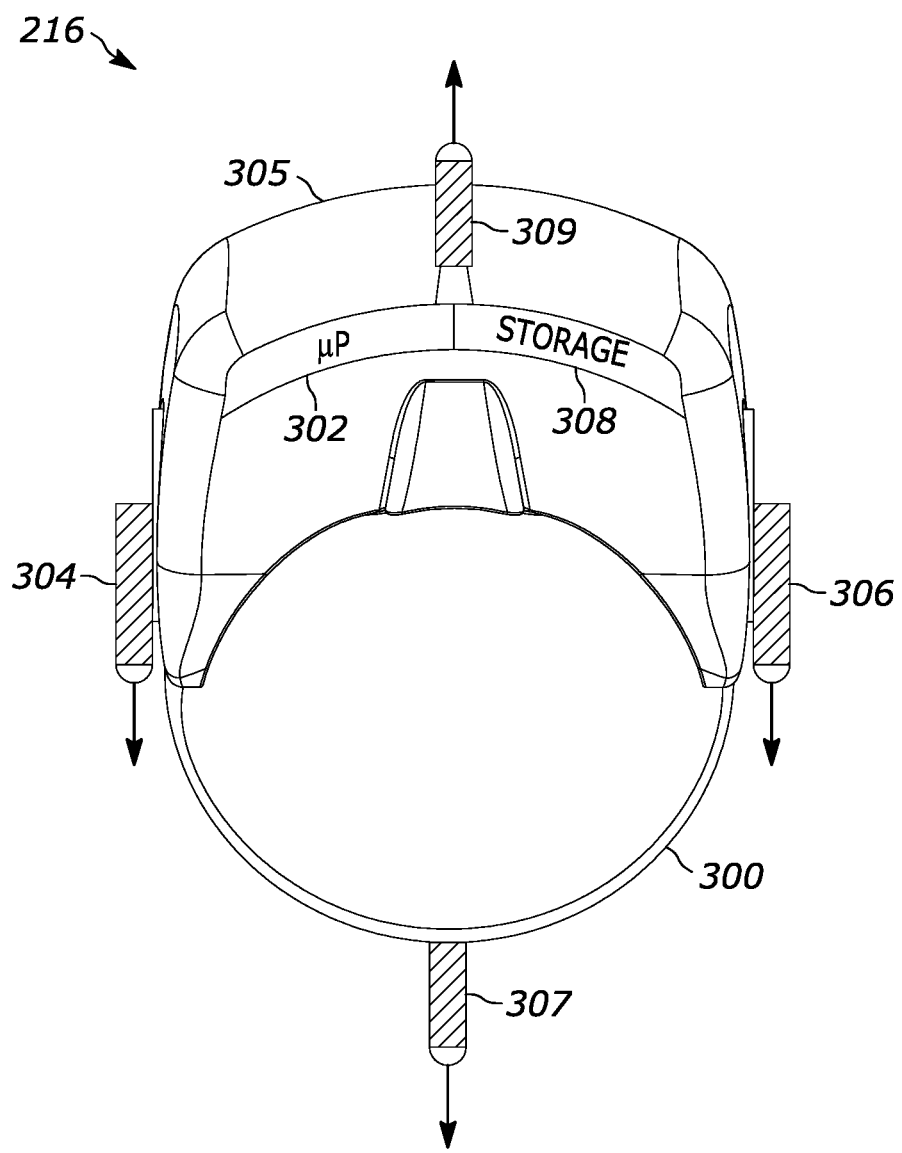
FIG. 3 is a top plan view of an example headset that may be used consistent with present principles.

Now describing FIG. 3, it shows a top plan view of a headset, such as the headset 216, consistent with present principles. The headset 216 may include a housing 300, at least one processor 302 in the housing, and a transparent "heads up" display 305 accessible to the at least one processor and coupled to the housing. The display 305 may have discrete left and right eye pieces as shown for presentation of stereoscopic augmented reality images/objects consistent with present principles, for example.

The headset 216 may also include first, second, and third rear-facing cameras 304, 306, 307. As shown, cameras 304, 306 may be mounted on side portions of the housing 300 where the user's temple would be when the user wears the headset 216. The camera 307 may be mounted on a rear portion of the housing where the back of the user's head would be when the user wears the headset 216. Rear-facing cameras may be mounted at other suitable locations as well and even though three rear-facing cameras 304, 306, 307 are shown, one or more may be included in any appropriate combination. The arrows shown for each of the cameras 304, 306, 307 demonstrate the imaging axis/direction for the rear-facing cameras to show that the respective fields of view for the cameras 304, 306, 307 are rear-facing outward away from the headset 216.

As also shown in FIG. 3, a front-facing camera 309 may also be included on the headset and a similar arrow is shown to demonstrate the field of view for the camera 309 as being front-facing outward away from the headset 216 in a direction opposite the rear-facing cameras 304, 306, and 307.

The cameras 304, 306, 307, and 309 may be used for, among other things, computer vision, image registration, spatial mapping, and/or simultaneous localization and mapping (SLAM) consistent with present principles.

Further note that inward-facing cameras may also be mounted within the headset 216 and oriented to image the user's eyes for eye tracking while the user wears the headset 216.

Additionally, the headset 316 may include storage 308 accessible to the processor 302 and coupled to the housing 300, as well as still other components not shown for simplicity such as vibrators, a network interface for communicating over a network such as the Internet, and a battery for powering components of the headset 216 such as the cameras 304, 306, 307, and 309. Additionally, note that while the headset 216 is illustrated as an augmented reality (AR) headset, it may also be established by computerized smart glasses or another type of headset. For example, the headset may be established by a virtual reality (VR) headset that may not have a transparent display but may still be able to present virtual AR objects on its display along with a real-world, real-time camera feed of an environment imaged by the front-facing camera 309 to provide an AR experience to the user.

Figure 4:
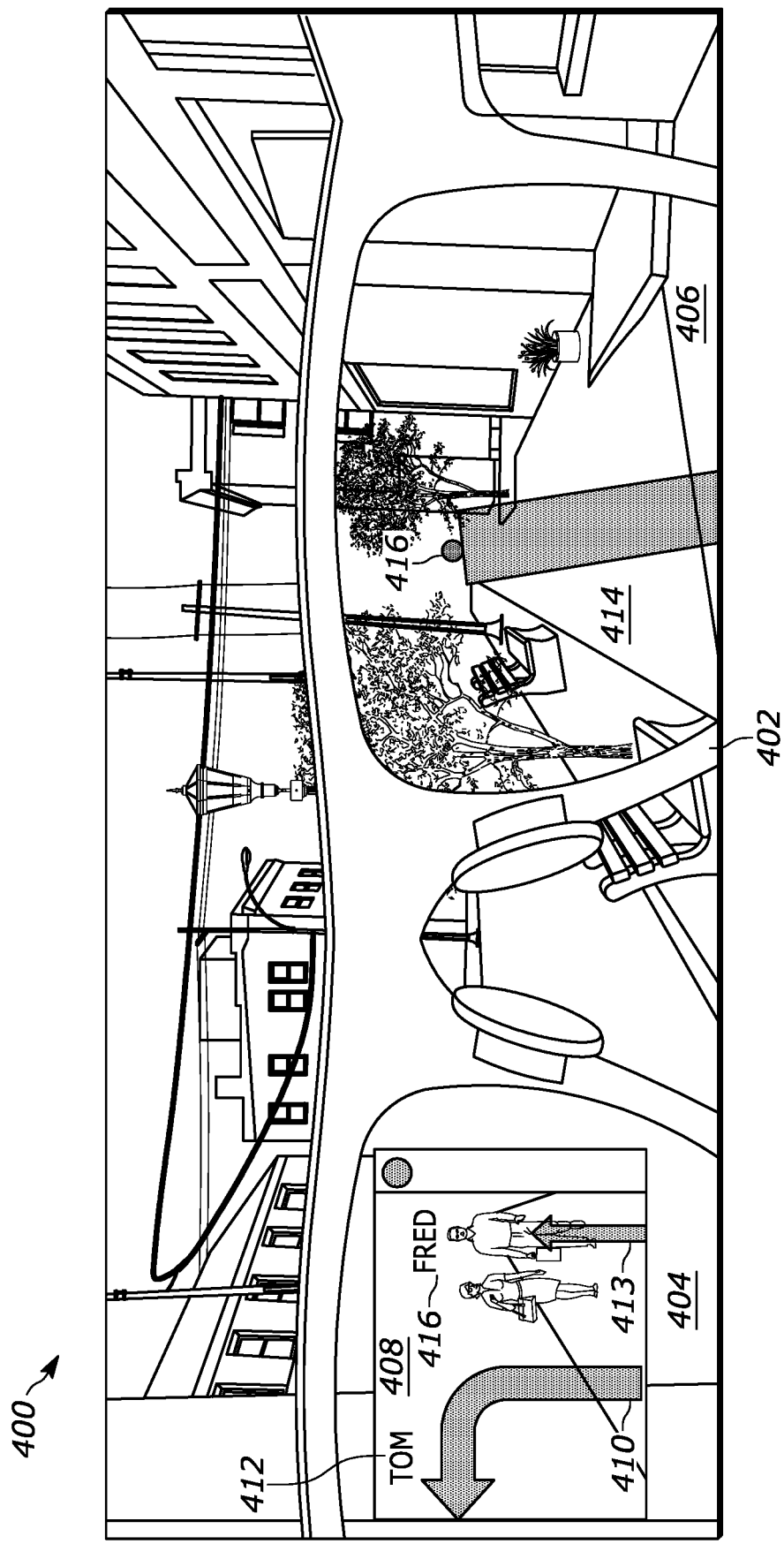
FIG. 4 shows an illustration of an example real world perspective of a user while wearing a headset consistent with present principles.

Referring now to FIG. 4, it shows an example real world perspective 400 of a user while wearing a headset 402 that is established by computerized smart glasses consistent with present principles. Note that left and right transparent displays 404, 406 of the headset 402 may be used for presenting AR images and may also establish lenses through which the user may view the real world.

As shown in FIG. 4, a live feed 408 of real time images/video from a rear-facing camera of the headset 402 may be presented on the transparent display 404. A virtual/graphical object 410 that in this example is an arrow curving to the left may be overlaid on the live feed 408 to indicate a direction in which another person, Tom, has traveled relative to the current location of the headset 402. Tom's movements may be determined using a computer vision algorithm and/or SLAM processing along with images from Tom's headset and/or the headset 402. Tom's movements may also be tracked and compared to a current location of the headset 402 using GPS coordinates from both headsets. Tom's name may be indicated via the indication 412, which also indicates that the arrow 410 relates to Tom's travel path.

Also overlaid on the live feed 408 may be a first part 413 of a virtual tether indicating where another person named Fred (denoted by indication 416) is located relative to the headset 402 so that the wearer/user of the headset 402 can keep track of Fred's current position via the live feed 408 without turning around as they walk together toward a destination. Fred's current position may be tracked using a mesh network for communication with Fred's device (e.g., another headset) to receive position information from Fred's device in GPS coordinates or another type of location-identifying format.

As also shown in FIG. 4, while the first part 413 of the virtual tether is shown superimposed over the live feed 408, another part/portion 414 of the same tether may be presented on the right lens display 406 of the device 402 apart from the live feed 408 so that the user can keep track of Fred via the part 414 while looking ahead in the real world rather than directly at the live feed 408. Note that in some example implementations the part 414 may move (e.g., clockwise or counterclockwise) in real time about an axis or point 416 to mimic extending backward toward Fred's current location as Fred moves relative to the front-facing axis of the headset 402 and/or as the user moves his or her head (and thus the headset 402) left and right, up and down. Moreover, if the user were to turn around to look at Fred through the displays 404, 406 in the real world rather than through the live feed 408, the portions 413, 414 may be merged into a continuous tether extending from the point 416 to Fred and/or his own headset. Thus, one end of the tether may be anchored to a fixed location defined by a location on the display 406 at which the point 416 is located, while another end of the tether may be anchored to Fred's device as Fred and the user move with respect to each other so that the user of the headset 402 may follow the tether all the way to Fred no matter how close or far away Fred might be in order to track Fred's location real time in three dimensions.

Also, note before moving on in the detailed description that the virtual tether may take other forms than the one shown, such as a graphical chain, cord, rope, or wire for example.

Figure 5:
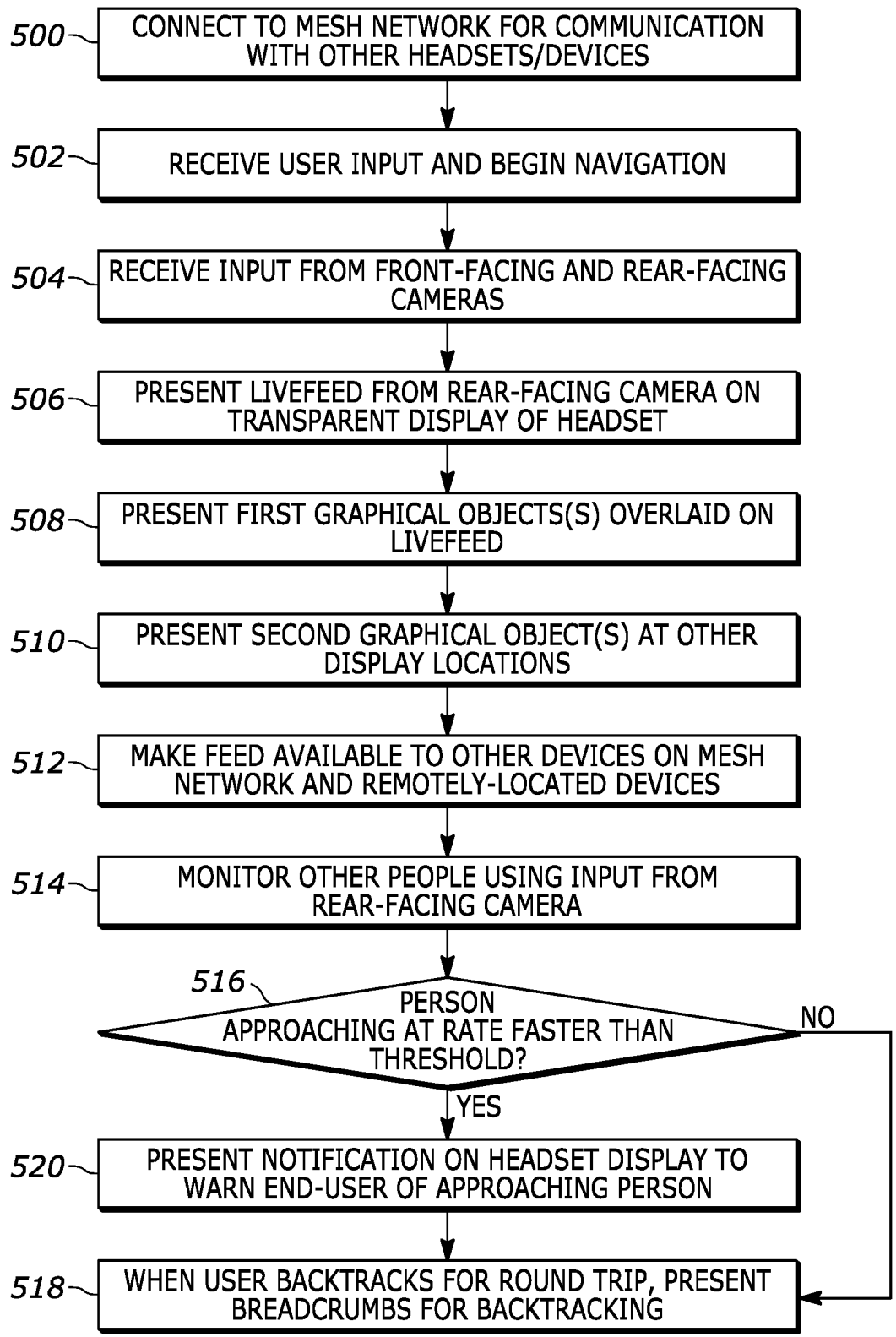
FIG. 5 is a flow chart of an example algorithm for use in virtual tethering, bread crumbing, and other aspects consistent with present principles.

Referring now to FIG. 5, it shows example logic that may be executed by a device such as the system 100 and/or a headset such as the headset 216 or 402 consistent with present principles. Beginning at block 500, the device may connect to the Internet and/or a mesh network to communicate with other headsets, smart phones, etc. The mesh network may be established by, for example, various headsets and smart phones that communicate directly, dynamically and non-hierarchically with each other and also coordinate transmissions with one another to efficiently route data between them. The devices that establish the mesh network may include, for example, devices specified or linked together by a user of the device. From block 500, the logic may then proceed to block 502.

At block 502 the device may receive user input indicating, for example, a destination to which the user would like to travel as provided using audible input or by typing in a destination address. Also at block 502, the device may use a maps application such as Google Maps to identify directions from the current location of the device (e.g., determined from GPS coordinates) to the destination and then provide audible and/or visual navigation instructions via the device. The logic may then proceed to block 504.

At block 504 the device may receive input from its front-facing and rear facing cameras and then, at block 506, present a live feed from the rear-facing camera on the display of the device. The logic may then proceed to block 508 where the device may use augmented reality processing to present one or more first graphical/virtual objects overlaid on the live feed consistent with present principles. From block 508 the logic may then proceed to block 510 where, based on the input from the front-facing camera received at block 504, the device may execute a computer vision, image registration, spatial mapping, and/or SLAM algorithms along with augmented reality processing to present one or more second graphical objects at other display locations than where the live feed is presented. From block 510 the logic may then move to block 512.

At block 512 the device may make the live feed from the from the rear-facing camera, and even a live feed from the front-facing camera, available to other devices on the mesh network and beyond, such as other devices connected over the Internet. The live feeds may then be viewed by another person such as a caregiver to track the whereabouts, location, and action of the user when, for example, the user himself or herself is slightly cognitively impaired. After executing block 512, the logic may proceed to block 514.

At block 514 the device may monitor other people and objects that might be located behind the user using input from the device's rear-facing camera. For example, the device may receive images from the rear-facing camera and then execute an object recognition and/or facial recognition algorithm along with computer vision and/or spatial analysis to identify people and other objects and track their movements and positions with respect to the device. The device may even execute an action recognition algorithm to identify suspicious behaviors based on input from the camera. From block 514 the device may then proceed to decision diamond 516.

At diamond 516 and based on the steps taken at block 514 the device may determine whether a person or other living thing (e.g., vicious dog) is approaching the device at a speed that is faster than a threshold rate and/or engaging in other suspicious behavior like looking around a lot and reaching into their pockets at the same time. A negative determination at diamond 516 may cause the logic to proceed to block 518 where the device may present bread crumbs for a user to follow someone else, or to backtrack along the route the user has taken as part of the directions. Bread crumbs will be described in more detail later.

However, note that if an affirmative determination is made at diamond 516 instead of a negative one, the logic may proceed to block 520 before moving to block 518. At block 518 the device may present audible and/or visual notifications to the user to warn the user of the fast-approaching person or other object (or other suspicious behavior). For example, a visual notification may be presented on the device's display to warn the end-user that a person is approaching from behind and a computerized voice may also be used to output an audible notification via the device's speaker(s) indicating "warning, warning, person coming up fast from behind". Vibrations in a predetermined sequence produced using the device's vibrator may also be used. These notifications may be helpful to the user to maintain safety and be aware of their surroundings since, e.g., an out of control skateboarder might collide with the user, a vicious dog might be running up to bite the user, or a person with nefarious intent may be fast approaching the user to surprise the user while doing harm or robbing the user.

Figure 6:
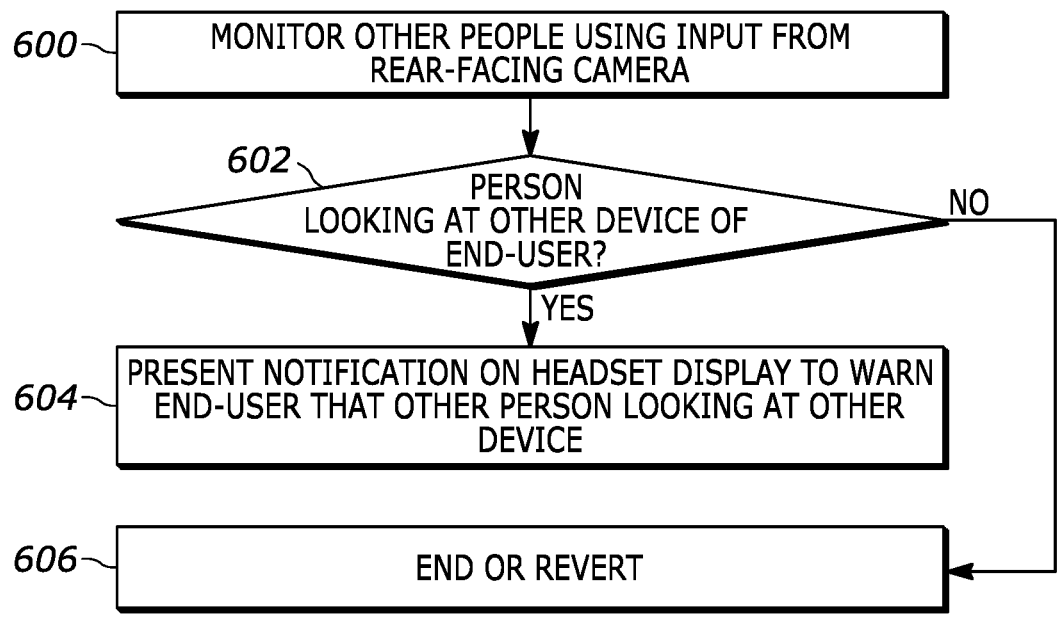
FIG. 6 is a flow chart of an example algorithm for warning a user if someone else is looking at a display screen of the user consistent with present principles.

Now describing FIG. 6, it also shows example logic that may be executed by a device such as a headset consistent with present principles. The logic of FIG. 6 may be executed in conjunction with the logic of FIG. 5 in some examples, though it may also be executed independently as well. In any case, the logic may begin at block 600 where the device may use object recognition, facial recognition, and/or an eye tracking algorithm along with images from a rear-facing camera on the device to monitor other people that might be shown in the images. From block 600 the logic may then proceed to decision diamond 602 where the device may determine, based on the monitoring, whether a person other than the user is looking at another device the user himself or herself is facing and controlling. The other device may be, for example, a laptop computer on a desk in front of the user that the user is using while also wearing the headset. Eye/pupil tracking may thus be used to, for example at diamond 602, determine whether the other person is looking at the laptop's display or is looking elsewhere but still over one of the shoulders of the user.

Thus, a negative determination (e.g., that the other person is not looking at the laptop's display) may cause the logic to proceed to block 606 where the logic may end or, for example, revert to one of the blocks of FIG. 5 such as block 504 to then proceed therefrom. However, an affirmative determination at diamond 602 may instead cause the logic to proceed to block 604 where the device may present a visual notification on the headset's display indicating the other person is looking at the user's other device/display. Additionally or alternatively, at block 604 the device may present an audible notification through the headset's speakers or connected headphones indicating "person looking at your screen" or the like, and/or present a haptic notification via the headset's vibrator(s) to produce vibrations in a certain sequence that the user would recognize as being associated with a determination that another person is looking over the shoulder of the user and/or at another display of the user.

Figure 7:
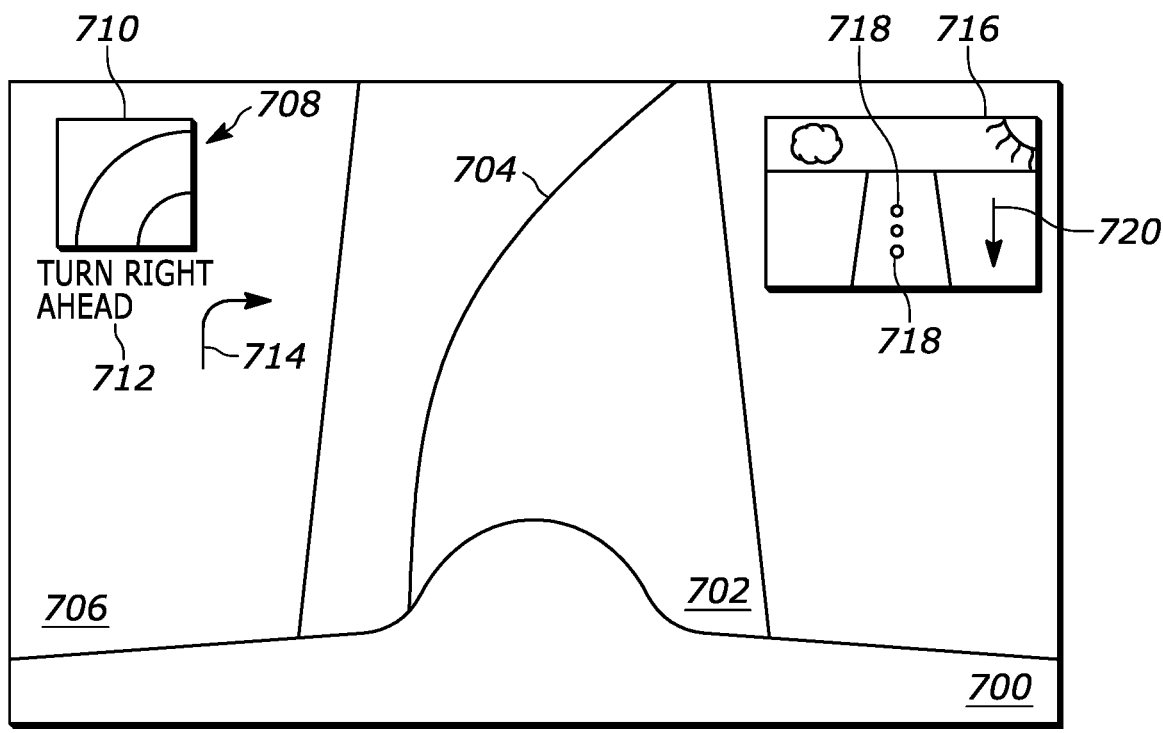
FIG. 7 illustrates an example of virtual tethering consistent with present principles.

Turning now to FIG. 7, it shows yet another real-world view of a user through a headset 700 consistent with present principles. As shown, the end-user is walking down a sidewalk 702 and a virtual tether 704 has been overlaid onto the user's real-world view using the transparent display 706 of the headset 700 through which the user is viewing the real world (including the sidewalk 702). The tether 704 may be virtually attached at one end to the user, and at the other end to the user's associate Tom. Also superimposed on the user's real-world view may be graphics 708 indicating directions for the user to follow in order to follow Tom, which in this case includes an image 710 from Tom's device of a location of a turn the user is to make shortly in order to continue following Tom. The graphics 708 may also include written instructions 712 along with an arrow 714 also indicating that the user should turn right ahead in order to follow Tom.

As also shown in FIG. 7, a video feed 716 from the rear-view camera of the headset 700 may also be superimposed on the user's view. And superimposed on the video feed 716 itself may be one or more virtual three-dimensional (3D) objects which in this case include virtual bread crumbs 718 that are presented using augmented reality software to appear as actually resting on the surface of the sidewalk behind the user in the path the user walked to indicate the actual real life route the user has traveled along the sidewalk 702 and/or to otherwise indicate previous movement of the user over time. An arrow 720 may also be presented to indicate a direction from which the user came while walking along the sidewalk 702 and/or to otherwise indicate previous movement of the user over time.

Figure 8:
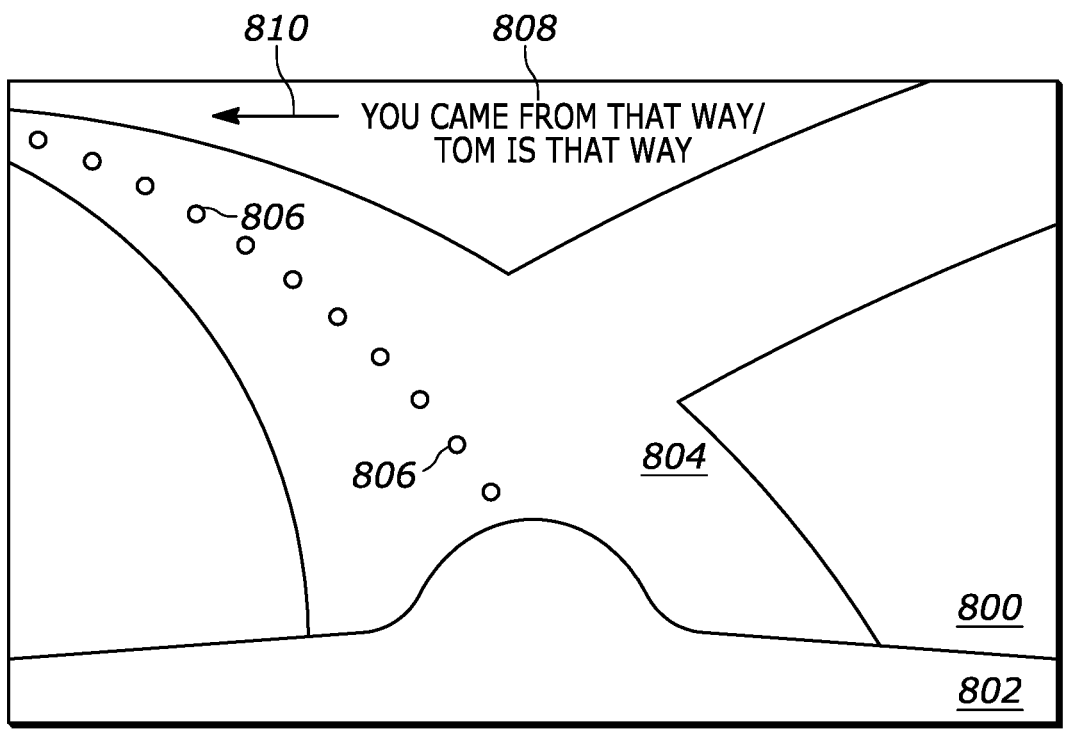
FIG. 8 illustrates an example of virtual bread crumbing consistent with present principles.

FIG. 8 shows another example consistent with present principles. In FIG. 8, again a real world view of an end-user is shown as the user might see it while looking out of the transparent display 800 of a headset 802. In this example, assume that the end-user is either following another person named Tom or is backtracking along a route the user previously walked, such as if the user were making a round trip from home to a friend's house and was currently returning on his or her way back home.

Accordingly, as depicted in FIG. 8 the user is again walking along a sidewalk 804 and is coming to a fork in the sidewalk 804 and thus must decide which way to proceed. Virtual bread crumbs 806 may be superimposed on the user's field of view using AR processing to appear as though actually laying down on the top surface of the sidewalk 804 itself.

If the user were following Tom, the path that Tom traveled ahead of the user may have been communicated to the headset 802. Then the location of the bread crumbs 806 may be determined based on the location tracking of Tom to indicate a path or route taken by Tom so that the user may follow the bread crumbs 806 and hence follow Tom.

If the user were making a round trip and backtracking along a route previously traveled and, for instance, forgot which way to go at the fork in the sidewalk shown, then the breadcrumbs may help the user follow the user's previous path as determined using the headset's own location-tracking features such as GPS tracking and computer vision.

As also shown in FIG. 8, in some examples text instructions 808 and a graphical arrow 810 may also be overlaid on the user's field of view using the display 800 in order to further assist the user.

Figure 9:
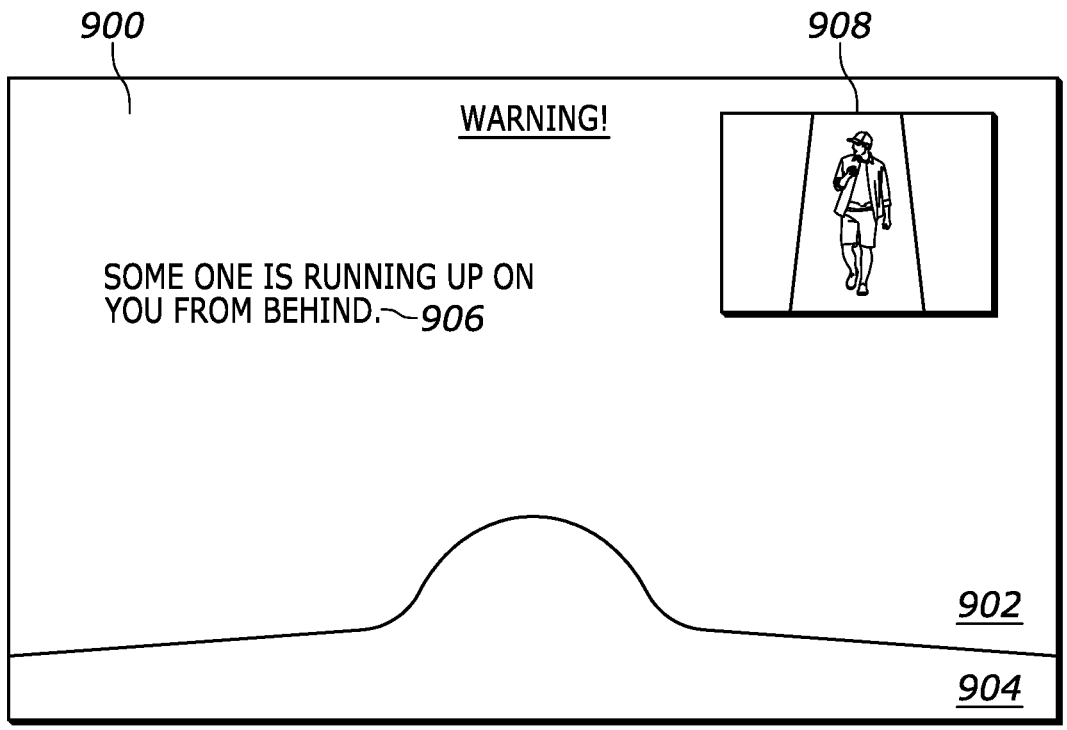
FIGS. 9 and 10 show example warning notifications that may be presented on a device's display consistent with present principles.

Continuing the detailed description in reference to FIG. 9, it shows an example warning message 900 that may be overlaid on the user's field of view of the real world through the display 902 of a headset 904 consistent with present principles. Note that the user's view of real-world objects and surroundings has been omitted for simplicity but may still be viewed by the user himself or herself. The warning message 900 itself may for example establish the notification presented at block 520 described above.

As shown in FIG. 9, the warning message 900 may include text 906 indicating that the headset has identified, from the headset's rear-facing camera, a person as running toward the user from behind. The real time live video feed 908 from the camera may also be presented, e.g., responsive to the affirmative determination at diamond 516 if it is not already being presented as part of a navigation or other process and in some examples a graphical object such as an arrow may be overlaid on the feed 908 and point toward the person running toward the user. The user may therefore be able to see who is running up on the user from behind using the feed 908 quicker than if the user had to turn around to do so.

Figure 10:
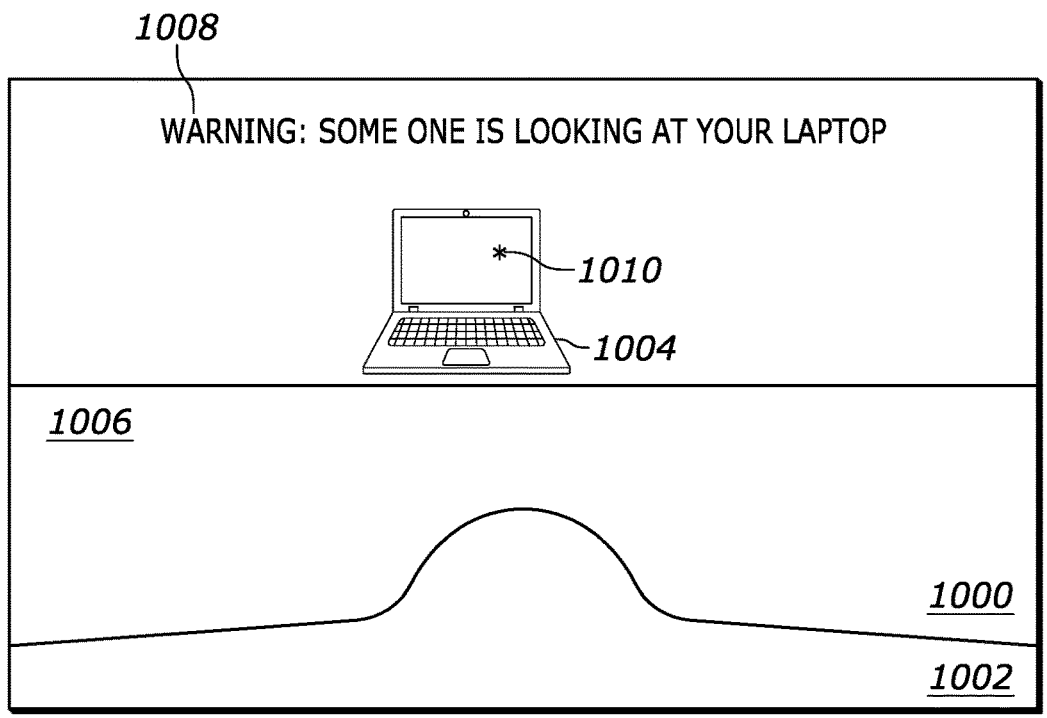

FIG. 10 shows yet another example. Here a user is again viewing the real-world through the transparent lens display 1000 of a headset 1002. A real-world laptop 1004 separate from the headset 1002 is within the user's field of view since the user is sitting at a table 1006 on which the laptop 1004 is resting.

Based on the headset 1002 determining, using input from its rear-facing camera, that a person other than the user is looking at the laptop's display as might occur according to diamond 602 described above, warning text 1008 may be presented on the display 1000. The text 1008 may be superimposed on the user's field of view to indicate that someone else is looking at the user's laptop display, which could compromise sensitive information presented on the display or create other privacy issues for the user. Furthermore, in some examples the headset 1002 may present a virtual star or other graphical object 1010 to appear as though actually located in the real-world at the specific portion/location of the laptop's display at which the headset 1002 has identified the other person as looking (e.g., using eye tracking).

Note that the headset 1002 may also provide an audible output to the user using speakers on the headset or headphones connected to the headset, such as "warning, someone else is looking over your shoulder at your laptop's display." Haptic notifications may also be provided to provide another discreet way of informing the user.

Still further, in some examples a real time live video feed from the headset's rear-facing camera may also be presented on the headset's display and in some examples a graphical object such as an arrow may be overlaid on the feed and point toward the person looking at the user's laptop 1004 to serve as another notification that the person is looking at the user's laptop 1004. The user may therefore be able to see who is looking over the user's shoulder at the user's laptop 1004 via the feed.

Additionally, another notification may be provided using the laptop 1004 itself. For example, the warning text 1008 may also be presented on the display of the laptop. Even further, the headset 1002 may communicate wirelessly with the laptop 1008 via Bluetooth or another protocol, or may communicate via a wired cable, to dim or turn off/deenergize the display of the laptop 1004 (but possibly not other system components) when the headset detects, using its rear-facing camera, unwanted pupil fixation on the laptop 1004 that exceeds a threshold amount of time.

Figure 11:
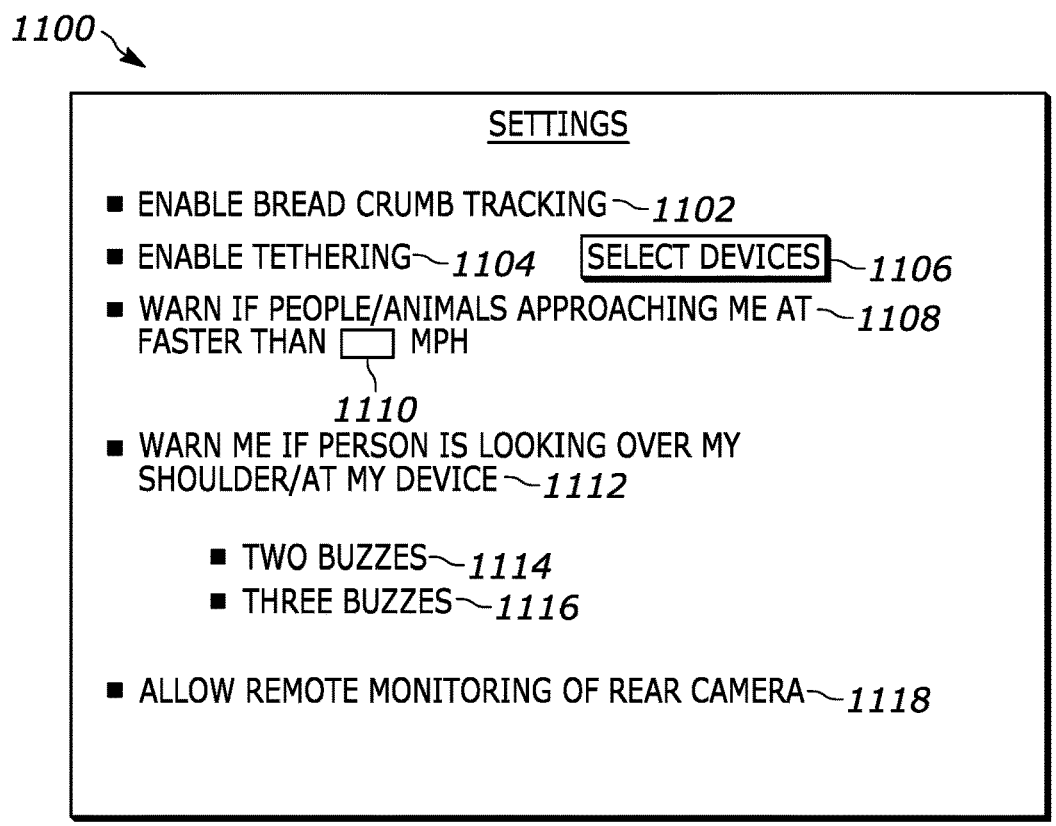
FIG. 11 shows an example graphical user interface (GUI) that may be used for configuring one or more settings of a device to operate consistent with present principles.

Continuing the detailed description in reference to FIG. 11, it shows an example graphical user interface (GUI) 1100 that may be presented on the display of a headset or even a smart phone or other device in communication with the headset in order to configure one or more settings of the headset (or other device) to operate consistent with present principles. It is to be understood that each of the options below may be selectable by an end user using gesture, touch, or cursor input directed to the respectively adjacent check box. Also note that each option may be de-selectable by unchecking the respective check box to disable the respective feature.

As shown in FIG. 11, the GUI 1100 may include a first option 1102 that may be selectable to set or enable the headset to, in the future, track a user's movements and present virtual bread crumbs at the headset as disclosed herein so that the user may see that his or her movements are being tracked and may even be able to backtrack along a previously-traveled route using the virtual bread crumbs as a guide.

Also shown is an option 1104 that may be selectable to set or enable the headset, to, in the future, perform virtual tethering with another person so that the user's headset and the headset of the other person may appear to be tethered together as disclosed herein so that the user may be able to locate and track another person with respect to the real time location of the user while the two might be traveling together and/or while one person might be following the other. A selector 1106 may even be presented to command another GUI to be presented from which one or more other people to which the headset should virtually tether may be selected. An example of such a GUI will be described later in reference to FIG. 12, but for now it is to be understood that plural tethers may be presented at the user's headset concurrently for each tethered person, depending on how many people the user is tethered to.

Still in reference to FIG. 11, also note that the GUI 1100 may include an option 1108 that may be selectable to set or enable the device to, in the future, warn the user via the headset if people or animals are approaching the user/headset at faster than a threshold speed or rate consistent with present principles. The end-user may even define the particular threshold rate that the headset is to use by providing numerical input using a hard or soft keyboard to input box 1110.

The GUI 1100 may further include an option 1112 that may be selectable to set or enable the device to, in the future, warn the user via the headset when people are identified as looking over the user's shoulder and/or at another device being operated by the user (such as in the laptop example of FIG. 10 above). If desired, sub-options may also be presented for selecting types of notifications to use for such warnings. For example, sub-option 1114 may be selected to select a notification of two vibrations in a row separated by a period of no vibration, while sub-option 1116 may be selected to select notifications of a similar pattern but including three vibrations rather than two. Sub-options for audible and visual notifications may also be presented on the GUI 1100, though not shown in FIG. 11 for simplicity. Also note that similar notification type sub-options may also be included for the option 1108 though similarly not shown for simplicity.

FIG. 11 also shows that the GUI 1100 may include an option 1118 that may be selectable to set or configure the headset to, in the future, allow other devices remote from the headset to access and monitor the real-time video feed of the headset's rear-facing camera, and possibly also the front-facing camera in certain examples.

Figure 12:
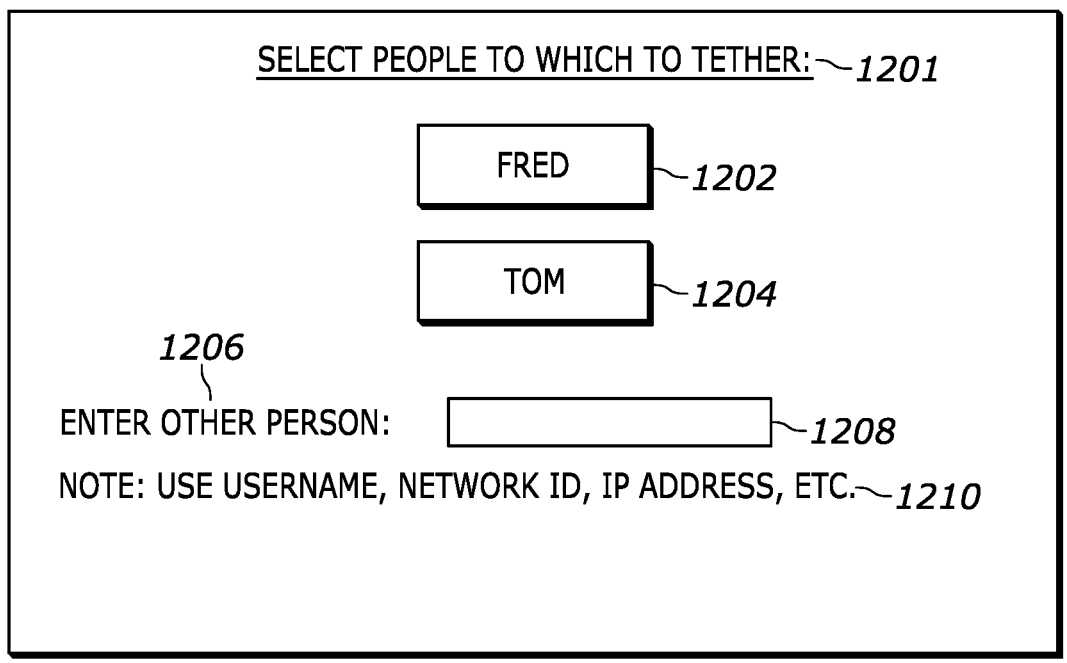
FIG. 12 shows an example GUI that may be used to select the devices of other people with which a user's device is to virtually tether consistent with present principles.

Now in reference to FIG. 12, a GUI 1200 is shown from which a user may select one or more persons to which to virtually tether via respective headsets. Thus, the GUI 1200 may also be presented on the display of a user's headset, or a smart phone or other device in communication with the headset, consistent with present principles.

As shown in FIG. 12, the GUI 1200 may include a prompt 1201 requesting the user to select one or more people to which to virtually tether. A first selector 1202 may be selected using gesture, touch, or cursor input to tether the user's headset to the headset of a person named Fred for which the headset already has network/communication information stored for location tracking. Likewise, a second selector 1204 may also be selected to select another person named Tom.

If desired, the GUI 1200 may also include a section 1206 at which the user may enter identifying information for another person for which to virtually tether. The person may be specified by the user by directing input to input box 1208 using a hard or soft keyboard. Instructions 1210 may assist the user by instructing in types of identifying information that the user may provide for the headset to then lookup the other person and establish a network connection with that person's headset. As reflected in the instructions 1210, in this example the user may enter a username, network identification, and/or internet protocol (IP) address for another device associated with the person sought to be tethered to the user.

Before concluding, it is to be reiterated that present principles may be applied at devices other than headsets. For example, a smart phone (or tablet) with opposing front-facing and rear-facing cameras may be used to provide virtual bread crumbing, virtual tethering, warnings, etc. when the phone is used in an augmented reality implementation in which the display of the smart phone presents a real-time video feed on its display that would mimic a field of view facing forward and also presents AR graphical objects consistent with present principles.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A headset, comprising:
   at least one processor;
   a rear-facing camera accessible to the at least one processor;
   a transparent display accessible to the at least one processor; and
   storage accessible to the at least one processor and comprising instructions executable by the at least one processor to:
   receive input from the rear-facing camera; and
   based on the input, present a feed from the rear-facing camera on the transparent display along with a virtual tether, the virtual tether moving clockwise and counterclockwise about an axis in real time as the headset moves for the virtual tether to mimic extending toward a current location of a person other than a user of the headset, the virtual tether being virtually anchored to the current location of the person.

2. The headset of claim 1, wherein the virtual tether is established by one or more of: a graphical chain, a graphical cord, a graphical rope, a graphical wire.

3. At least one computer readable storage medium (CRSM) that is not a transitory signal, the computer readable storage medium comprising instructions executable by at least one processor to:
   receive input from a rear-facing camera of a first device;
   determine, based on the input, that a person other than a user of the first device is looking at a display of a second device, the second device being different from the first device; and
   based on the determination, present images from the rear-facing camera on a display of the first device.

4. The CRSM of claim 3, wherein the first device comprises a headset, and wherein the instructions are executable to:
execute eye tracking using the input from the rear-facing camera to make the determination.

5. The CRSM of claim 3, wherein the instructions are executable to:
   based on the determination, present at least one graphical object on the display of the first device, the graphical object indicating a particular location on the display of the second device at which the person is determined to be looking.

6. The CRSM of claim 5, wherein the graphical object is presented on the display of the first device to appear as though actually located in the real-world at the particular location on the display of the second device at which the person is determined to be looking.

7. The CRSM of claim 3, wherein the instructions are executable to:
   based on the determination, present a notification on the display of the first device, the notification comprising text indicating that the person is determined to be looking at the display of the second device.

8. The CRSM of claim 3, wherein the instructions are executable to:
   based on the determination, present at least one graphical object on the display of the first device so that the graphical object is overlaid on the images from the rear-facing camera, the graphical object being different from the images from the rear-facing camera, the graphical object indicating the person as shown in the images from the rear-facing camera.

9. The CRSM of claim 8, wherein the graphical object points toward the person as shown in the images from the rear-facing camera.

10. The CRSM of claim 3, wherein the instructions are executable to:
    based on the determination, present an audible notification using one or more speakers controlled by the first device, the audible notification indicating that the person is looking at the display of the second device.

11. The CRSM of claim 3, wherein the instructions are executable to:
    based on the determination, communicate with the second device to dim and/or turn off the display of the second device.

12. The CRSM of claim 3, wherein the instructions are executable to:
    based on the determination, communicate with the second device to present a notification on the display of the second device that indicates that the person is looking at the display of the second device.

13. The CRSM of claim 3, comprising the at least one processor.

14. A method, comprising:
    receiving input from a rear-facing camera of a first device;
    determining, based on the input, that a person other than a user of the first device is looking at a display of a second device, the second device being different from the first device; and
    based on the determining, presenting at least one graphical object on a display of the first device, the graphical object indicating a particular location on the display of the second device at which the person is determined to be looking.

15. The method of claim 14, comprising:
    based on the determining, presenting images from the rear-facing camera on the display of the first device.

16. The method of claim 15, wherein the at least one graphical object is a first graphical object, and wherein the method comprises:

based on the determining, presenting a second graphical object on the display of the first device so that the second graphical object is overlaid on the images from the rear-facing camera, the second graphical object indicating the person as shown in the images from the rear-facing camera.

17. The method of claim 14, comprising:

executing eye tracking using the input from the rear-facing camera to perform the determining.

18. The method of claim 14, wherein the graphical object is presented on the display of the first device to appear as though actually located in the real-world at the particular location on the display of the second device at which the person is determined to be looking.

19. The method of claim 14, comprising:

determining, based on the input, that the person is looking at the display of the second device for more than a threshold amount of time; and based on the determining that the person is looking at the display of the second device for more than the threshold amount of time, communicating with the second device to dim and/or turn off the display of the second device.

20. The method of claim 14, comprising:

based on the determining, communicating with the second device to present a notification on the display of the second device that indicates that the person is looking at the display of the second device.

\* \* \* \* \*